United States Patent
Kim et al.

(10) Patent No.: US 9,426,394 B2
(45) Date of Patent: Aug. 23, 2016

(54) IMAGE SENSOR AND METHOD OF CORRECTING OUTPUT SIGNAL OF THE IMAGE SENSOR BASED ON SIGNALS FROM DIFFERENT PIXEL ROWS

(71) Applicant: SAMSUNG ELECTRONICS CO., LTD., Suwon-si, Gyeonggi-do (KR)

(72) Inventors: Young-Chan Kim, Seongnam-si (KR); Seung-Sik Kim, Hwaseong-si (KR); Tae-Han Kim, Suwon-si (KR); Eun-Sub Shim, Anyang-si (KR); Dong-Joo Yang, Seongnam-si (KR); Min-Seok Oh, Osansi (KR); Moo-Sup Lim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 6 days.

(21) Appl. No.: 14/516,907

(22) Filed: Oct. 17, 2014

(65) Prior Publication Data
US 2015/0208006 A1    Jul. 23, 2015

(30) Foreign Application Priority Data

Jan. 21, 2014   (KR) .................. 10-2014-0007396

(51) Int. Cl.
| | |
|---|---|
| *H04N 5/361* | (2011.01) |
| *H04N 5/359* | (2011.01) |
| *H04N 5/378* | (2011.01) |
| *H04N 5/3745* | (2011.01) |

(52) U.S. Cl.
CPC .............. *H04N 5/361* (2013.01); *H04N 5/359* (2013.01); *H04N 5/378* (2013.01); *H04N 5/37455* (2013.01)

(58) Field of Classification Search
CPC .. H04N 5/361; H04N 5/37455; H04N 5/378; H04N 5/3575; H04N 5/359
See application file for complete search history.

(56) References Cited

U.S. PATENT DOCUMENTS

| | | | |
|---|---|---|---|
| 4,584,607 A * | 4/1986 | Miyazawa | H04N 5/361 |
| | | | 348/E5.081 |
| 6,822,212 B2 * | 11/2004 | Machida | H04N 5/363 |
| | | | 250/208.1 |
| 8,077,240 B2 | 12/2011 | Ellis-Monaghan et al. | |
| 8,654,231 B2 | 2/2014 | Kurokawa et al. | |
| 2006/0261251 A1 * | 11/2006 | Fossum | H04N 5/3575 |
| | | | 250/208.1 |
| 2011/0018850 A1 * | 1/2011 | Uehata | G02F 1/13338 |
| | | | 345/207 |
| 2012/0033117 A1 | 2/2012 | Murata et al. | |
| 2012/0038811 A1 | 2/2012 | Ellis-Monaghan et al. | |
| 2012/0293699 A1 | 11/2012 | Blanquart et al. | |
| 2013/0016263 A1 | 1/2013 | Sato et al. | |
| 2013/0188079 A1 * | 7/2013 | Sakano | H04N 5/335 |
| | | | 348/308 |
| 2013/0299888 A1 | 11/2013 | Kurokawa et al. | |

FOREIGN PATENT DOCUMENTS

| | | |
|---|---|---|
| JP | 2011-211699 | 10/2011 |
| KR | 10-2013-0064168 A | 6/2013 |

* cited by examiner

*Primary Examiner* — Nicholas Giles
(74) *Attorney, Agent, or Firm* — Lee & Morse, P.C.

(57) ABSTRACT

A method of processing signals from an image sensor outputting signals from rows of pixels in the image sensor having optical signals, outputting signals from rows of pixels in the image sensor not having optical signals, and correcting the signals from the rows of pixels having optical signals based on the signals corresponding to the rows of pixels not having optical signals.

18 Claims, 11 Drawing Sheets

IMAGE SENSOR AND METHOD OF CORRECTING OUTPUT SIGNAL OF THE IMAGE SENSOR BASED ON SIGNALS FROM DIFFERENT PIXEL ROWS

CROSS-REFERENCE TO RELATED APPLICATION

Korean Patent Application No. 10-2014-0007396, filed on Jan. 21, 2014, and entitled, "Image Sensor and Method of Correcting Output Signal of the Image Sensor," is incorporated by reference herein in its entirety.

BACKGROUND

1. Field

One or more embodiments described herein relate to an image sensor and a method of correcting an output signal of the image sensor.

2. Description of Related Art

An image sensor may be mounted in the camera of a mobile phone, in a digital still camera, or another electronic device. In operation, the image sensor captures images and converts them into electrical signals, e.g., transmittable digital image signals. The digital image signals may include image data having three colors, e.g., red, green, and blue. Signal processing is performed on the digital image signals to drive a display device. The image sensor may be a CMOS image sensor and the display device may be a liquid crystal display.

SUMMARY

In accordance with one embodiment, a method of processing signals from an image sensor, which includes a plurality of pixels in each of a plurality of rows, the method comprising outputting signals from rows having optical signals, outputting signals from rows not having optical signals, and correcting the signals from the rows having optical signals based on the signals corresponding to the rows not having optical signals.

Correcting the signals corresponding to the rows having the optical signals may include correcting signals output from pixels of odd-numbered rows and correcting signals output from pixels of even-numbered rows.

Correcting the signals output from the pixels of the odd-numbered rows may include transmitting a signal from a photodiode region to a storage diode region in each of the pixels of the odd-numbered rows, reading the signal of the storage diode region included in each of the pixels of the odd-numbered rows and the pixels of the even-numbered rows, and subtracting values of the signals output from the pixels of the even-numbered rows from corresponding values of the signals output from the pixels of the odd-numbered rows.

Correcting the signals output from the pixels of the even-numbered rows may include transmitting a signal from a photodiode region to a storage diode region in each of the pixels of the even-numbered rows, reading a signal of a storage diode region included in each of the pixels of the odd-numbered rows and the pixels of the even-numbered rows, and subtracting values of the signals output from the pixels of the odd-numbered rows, from corresponding values of the signals output from the pixels of the even-numbered rows.

Correcting the signals corresponding to the rows having the optical signals may include transmitting a signal from a photodiode region to a storage diode region in each pixel of odd-numbered rows and each pixel of even-numbered rows, primarily reading a signal of a storage diode region included in each pixel of the odd-numbered rows and each pixel of the even-numbered rows, secondarily reading a signal of the storage diode region included in each pixel of the odd-numbered rows and each pixel of the even-numbered rows while a storage transistor is turned off, and subtracting values of the secondary readout signals from values of the primary readout signals.

In accordance with another embodiment, an image sensor includes a row driver configured to generate a storage control signal, a transfer control signal, a reset control signal, and a row selecting signal, a pixel array including a plurality of rows of pixels configured to receive optical signals and to convert the optical signals to electrical signals, and configured to output the electrical signals as image signals in response to the storage control signal, the transfer control signal, the reset control signal, and the row selecting signal, an analog-to-digital converter configured to perform an analog-to-digital conversion on the image signals to generate first signals, and an output correcting circuit configured to compare sizes of signals corresponding to rows having optical signals among the first signals with sizes of signals corresponding to rows not having optical signals, and to correct the signals corresponding to the rows having the optical signals to generate second signals.

A time for transferring a charge generated from a photodiode, included in each of the pixels in a row, to a storage diode may be different with respect to odd-numbered rows and even-numbered rows of the pixel array. A time for transferring the charge, which is generated from the photodiode included in each of the pixels in a row, to the storage diode may be determined by a storage control signal. Readout of signals from the storage diodes in the pixels in the plurality of rows may be configured to be performed at substantially a same time.

The image sensor may be configured to subtract values of signals output from the pixels of the rows not having optical signals from corresponding values of signals output from the pixels of the rows having optical signals, among the readout signals.

The image sensor may be configured to primarily read signals of storage diode regions when corresponding storage transistors are turned on, secondarily read signals of the storage diode regions when the corresponding storage transistors are turned off, subtract values of the secondary readout signals from corresponding values of the primary readout signals, and correct the signals output from the pixels of the odd-numbered rows and the pixels of the even-numbered rows.

The image sensor may be configured to transmit signals from photodiode regions to corresponding storage diode regions in the pixels of odd-numbered rows, read signals of storage diode regions included in the pixels of the odd-numbered rows and pixels of even-numbered rows, subtract values of signals output from the pixels of the even-numbered rows from corresponding values of signals output from the pixels of the odd-numbered rows, and correct the signals output from the pixels of the odd-numbered rows.

The image sensor may be configured to transmit signals from photodiode regions to corresponding storage diode regions in the pixels of even-numbered rows, read signals of storage diode regions included in the pixels of the even-numbered rows and pixels of odd-numbered rows, subtract values of signals output from the pixels of the odd-numbered rows from corresponding values of signals output from the pixels of the even-numbered rows, and correct the signals output from the pixels of the even-numbered rows.

The image sensor may be configured to transmit signals from photodiode regions to storage diode regions in the pixels of odd-numbered rows and pixels of even-numbered rows, primarily read signals of storage diode regions included in the pixels of the odd-numbered rows and the pixels of the even-numbered rows when a storage transistor is turned on, secondarily read signals of storage diode regions included in the pixels of the odd-numbered rows and the pixels of the even-numbered rows when a storage transistor is turned off, subtract values of the secondary readout signals from values of the primary readout signals, and correct the signals output from the pixels of the odd-numbered rows and the pixels of the even-numbered rows. A buffer circuit may be configured to latch and amplify the second signals to generate output signals.

In accordance with another embodiment, a method for correcting signals from an image sensor includes transmitting a signal from a photodiode region to a storage diode region in each of a plurality of pixels in first rows of the image sensor, reading a signal of a storage diode region in each of the pixels of the first rows and each of a plurality of pixels in second rows of the image sensor, and subtracting values of signals from the pixels of the second rows from corresponding values of signals output from the pixels of the first rows among the readout signals. The first rows may be odd-numbered rows, and the second rows may be even-numbered rows.

The signal read out from the storage diode region in each of the pixels of the first rows may be based on charged generated from a corresponding photodiode, and the signal read out from the storage diode region in each of the pixels in the second rows may be based on leakage current and is independent from charge generated from a corresponding photodiode. The pixels in the first row may have optical signals, and the pixels in the second row may not have optical signals. The signals may be read out from the storage diode regions in the pixels of the first and second rows at substantially a same time.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
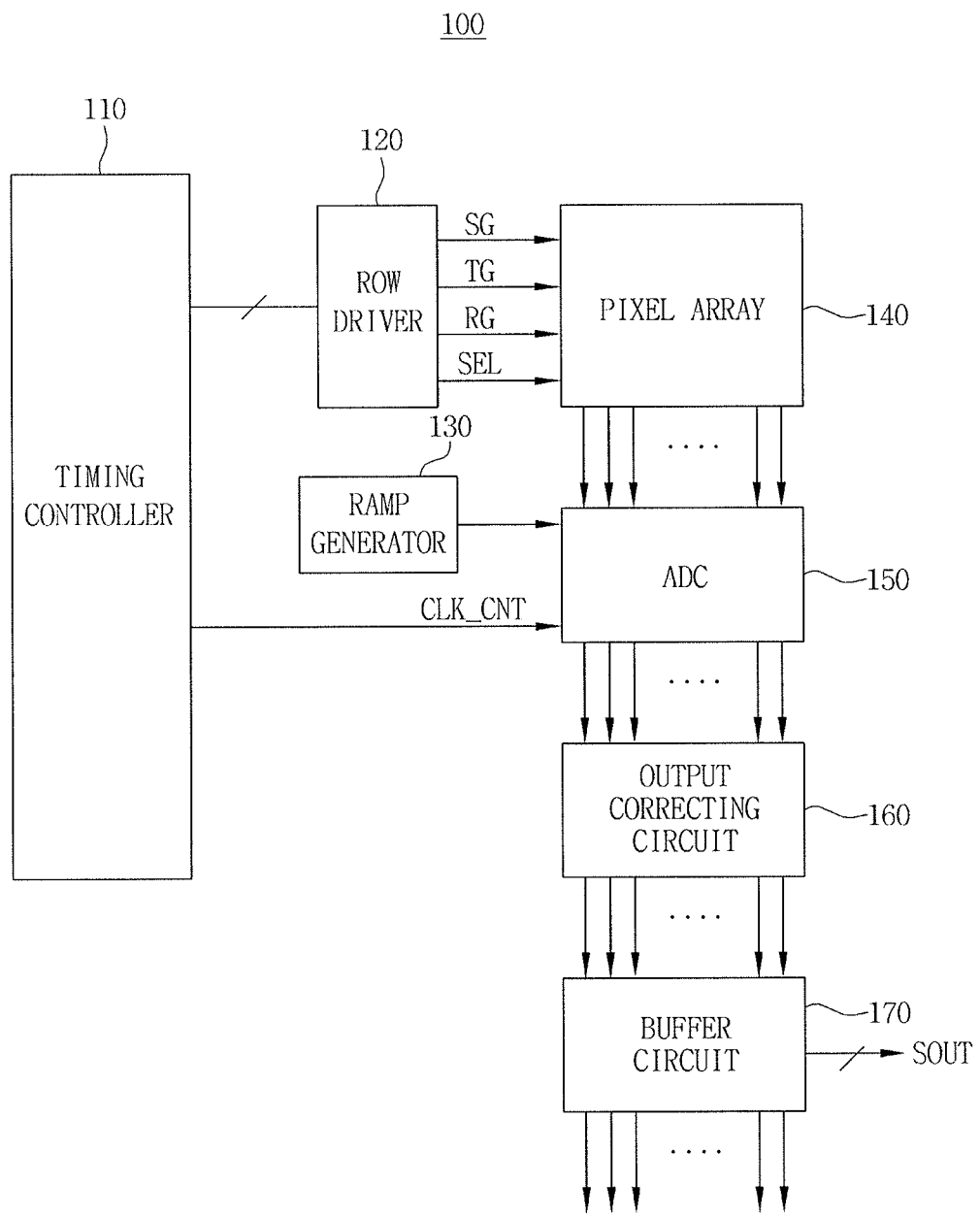
FIG. 1 illustrates an embodiment of an image sensor.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an image sensor 100 which includes a timing controller 110, a row driver 120, a ramp generator 130, a pixel array 140, an analog-to-digital converter (ADC) 150, an output correcting circuit 160, and a buffer circuit 170.

The timing controller 110 generates control signals to control operations of the row driver 120 and the ADC 150.

The row driver 120 generates a storage control signal (SG), a transfer control signal (TG), a reset control signal (RG), and a row selecting signal (SEL) to control an operation of the pixel array 140 in response the control signals from the timing controller 110.

The pixel array 140 includes a plurality of pixels, which, for example, may include red pixels for converting light of the red spectral region to electric signals, green pixels for converting light of the green spectral region to electric signals, and blue pixels for converting light of the blue spectral region to electric signals.

The ramp signal generator generates a ramp signal.

The ADC 150 receives image signals in analog form from the pixel array 140, in response to the ramp signal and a clock signal CLK_CNT received from the timing controller 110. The ADC 150 converts the analog image signals to digital signals. The ADC 150 may convert the analog image signals to the digital signals, for example, based on a correlated double sampling (CDS) method.

The output correcting circuit 160 may compensate output signals from ADC 150 using signals corresponding to rows having optical signals with signals corresponding to rows not having optical signals.

The buffer circuit 170 latches and amplifies output signals of the output correcting circuit 160 to generate sensor output signals SOUT.

Figure 2:
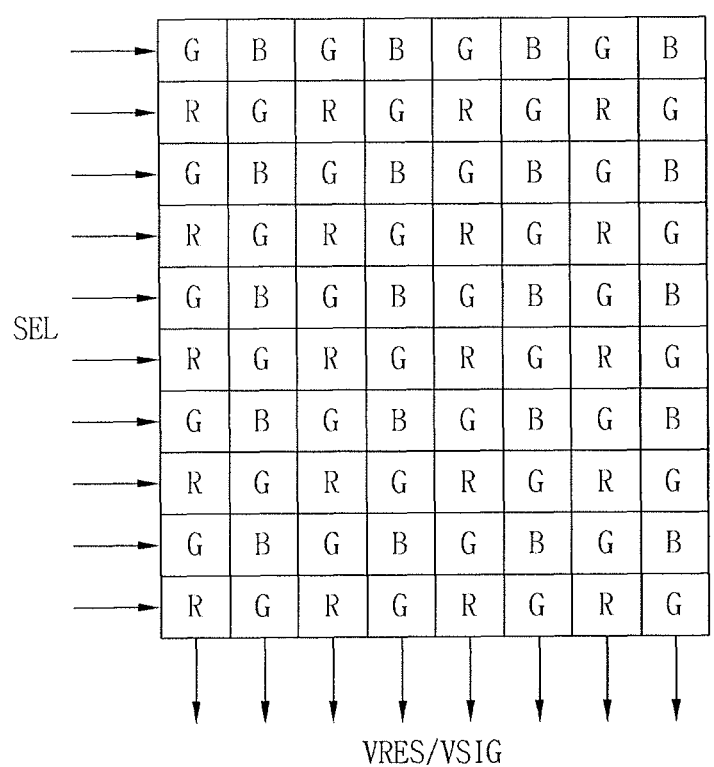
FIG. 2 illustrates an embodiment of a color filter pattern of a pixel array.

FIG. 2 illustrates an embodiment of a color filter pattern of the pixel array 140 in the image sensor of FIG. 1.

Referring to FIG. 2, a color filter may be disposed on each pixel in the pixel array 140, to receive only light of a particular color.

For example, three kinds of color filters may be disposed on each pixel in the pixel array 140. The color filters may be disposed, for example, in a Bayer pattern in which a first pattern of two colors of red (R) and green (G) are disposed in a row and a second pattern of two colors of green (G) and blue (B) are disposed in the next row. The green color (G) related to a brightness signal may be disposed in all rows, and may be alternately disposed with the red color (R) or the blue color (B) in each row to enhance resolution.

In the image sensor 100 having a pixel structure described above, the pixel array 140 detects light using a photodiode, and converts the light into electrical signals that correspond to image signals.

Figure 3:
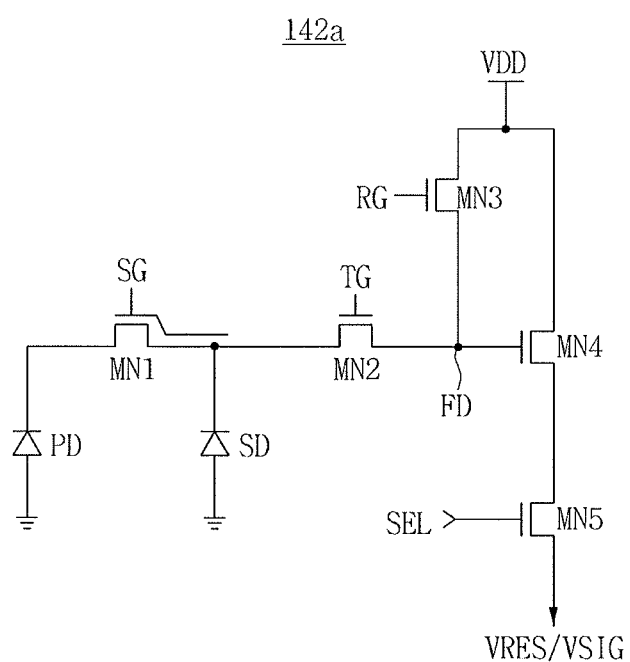
FIG. 3 illustrates an embodiment of a pixel driving circuit.

FIG. 3 illustrates an embodiment of a pixel driving circuit 142a that drives a unit pixel of a pixel array 140 in the image sensor of FIG. 1. Referring to FIG. 3, the pixel driving circuit 142a may include a photodiode PD, a storage diode SD, and NMOS transistors MN1, MN2, MN3, MN4, and MN5.

The first NMOS transistor MN1 serves as a storage transistor and operates in response to the storage control signal SG. The first NMOS transistor MN1 transfers charges from the photodiode PD to the storage diode SD. A cathode of the storage diode SD may be a storage diode region. The gate terminal of the first NMOS transistor MN1 may cover the surface of the storage diode SD in the semiconductor integrated circuit.

The second NMOS transistor MN2 serves as a transfer transistor and operates in response to the transfer control signal TG. The second NMOS transistor MN2 transfers charges accumulated in the storage diode SD to a floating diffusion node FD.

The third NMOS transistor MN3 serves as a reset transistor and operates in response to the reset control signal RG. The third NMOS transistor MN3 resets the floating diffusion node FD using a supply voltage VDD.

The fourth NMOS transistor MN4 serves as a driving transistor and operates in response to a voltage of the floating diffusion node FD. The fourth NMOS transistor MN4 outputs electrical signals proportional to an amount of charge transferred from the storage diode SD to the floating diffusion node FD.

The fifth NMOS transistor MN5 serves as a selecting transistor and operates in response to the row selecting signal SEL. The fifth NMOS transistor MN5 transmits an output signal of the fourth NMOS transistor MN4 to the ADC 150.

The pixel driving circuit 142a may operate in a rolling shutter mode or in a global shutter mode according to the states of control signals SG, TG, RG, and SEL. In rolling shutter mode, signals photoelectrically converted by the photodiode PD of each row in one frame are selected in order and transferred to the floating diffusion node FD. Corresponding image signals are then output. In global shutter mode, signals photoelectrically converted by the photodiode PD of all the rows in one frame are transferred to the floating diffusion node FD at a time. Corresponding image signals are then output in order from a selected row.

When the pixel driving circuit 142a of FIG. 3 operates in the rolling shutter mode or in the global shutter mode, if the reset control signal RG is enabled in the pixel selected by the row selecting signal SEL, a signal of the floating diffusion node FD transferred from the supply voltage VDD is output as a reset signal VRES. If the transfer control signal TG is enabled, a signal transferred from the photodiode PD to the floating diffusion node FD is output as an image signal VSIG. In the rolling shutter mode, the image signal may be output after the reset signal VRES is output. However, in the global shutter mode, the image signal VSIG may be output before the reset signal VRES is output.

When the analog-to-digital conversion is performed using a CDS method, the ADC 150 may convert the image signal VSIG from analog form to a digital signal based on a difference between the image signal VSIG and the reset signal VRES. The control signals SG, TG, RG, and SEL applied to the pixel driving circuit 142a may be generated by the row driver 120 in FIG. 1.

Figure 4:
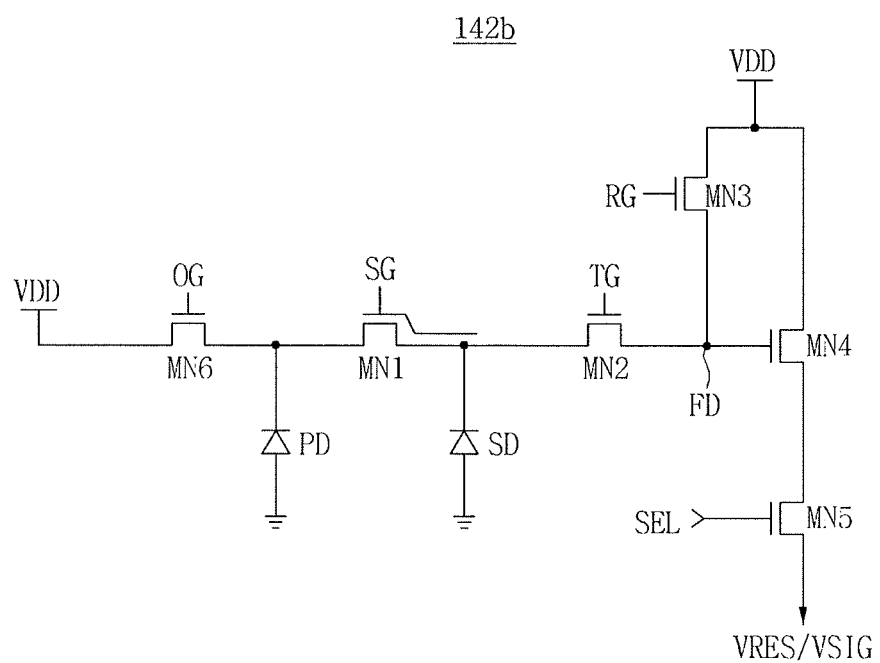
FIG. 4 illustrates another embodiment of a pixel driving circuit.

FIG. 4 illustrates another embodiment of a pixel driving circuit 142b that drives a unit pixel of a pixel array in the image sensor of FIG. 1. Referring to FIG. 4, the pixel driving circuit 142b includes a photodiode PD, a storage diode SD, and NMOS transistors MN1, MN2, MN3, MN4, MN5, and MN6.

The pixel driving circuit 142b has a configuration in which the NMOS transistor MN6 is included in the pixel driving circuit 142a of FIG. 3. The NMOS transistor MN6 operates in response to an overflow control signal OG, and may function to prevent charge in the photodiode region (e.g., a cathode of the photodiode PD) from overflowing. The pixel driving circuit 142b may operate in a manner similar to the pixel driving circuit 142a of FIG. 3.

Figure 5:
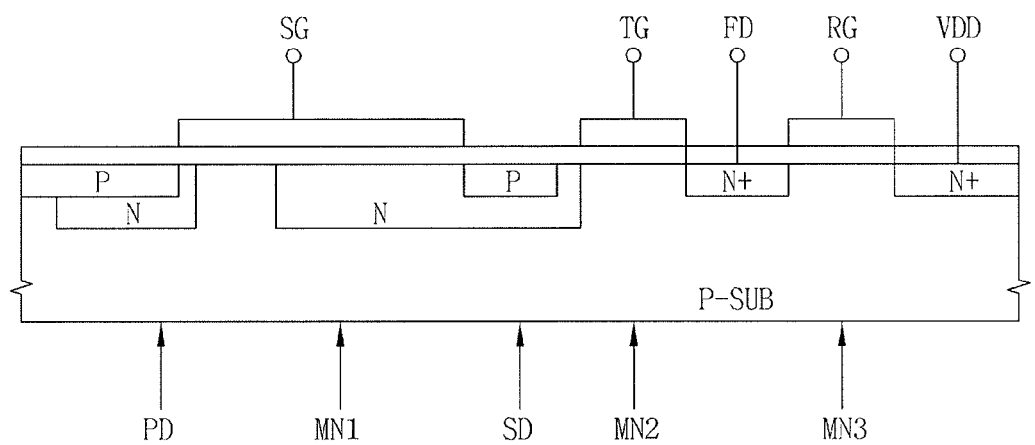
FIG. 5 illustrates an embodiment of an integrated circuit for a pixel driving circuit.

FIG. 5 is a cross-sectional diagram illustrating a vertical structure of one embodiment of an integrated circuit for the pixel driving circuit of FIG. 3. In FIG. 5, the photodiode PD, the storage diode SD, and NMOS transistors MN1, MN2, and MN3 are illustratively shown. In an alternative embodiment, multiple pixels may output charge for storage in a same storage diode or a same floating diode.

Figure 6:
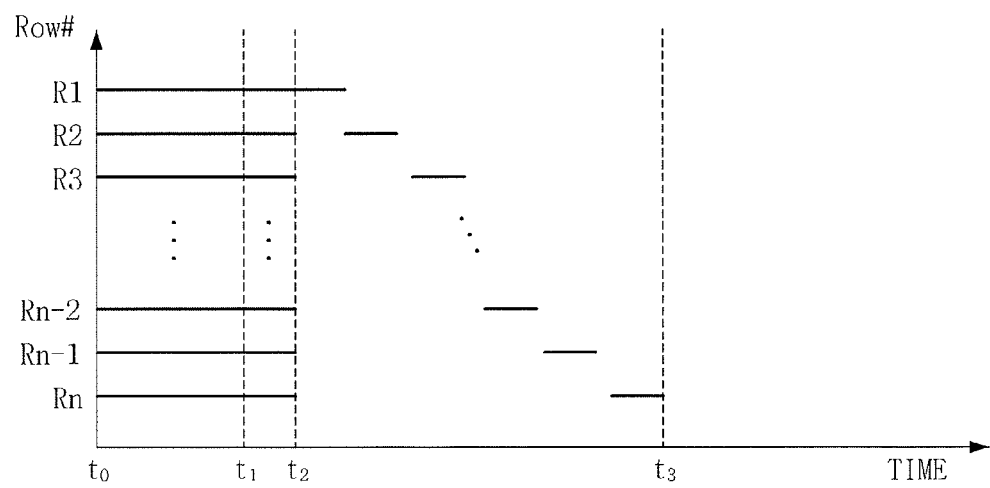
FIG. 6 illustrates a process of outputting data from one type of pixel array.

FIG. 6 illustrates one embodiment of a timing diagram used in a process for outputting data from one type of pixel array. In FIG. 6, R1 to Rn denote rows in the pixel array. In time period t0-t1, charge is generated from the photodiode PD region when the photodiode region receives an optical signal, e.g., light from an object to be imaged. In time period t1-t2, charge is transferred from the photodiode PD region to the storage diode SD region. In time period t2-t3, an image signal is output through the floating diffusion node FD from the storage diode SD region.

In the timing diagram of FIG. 6, the time required for data to be output from pixels in different rows may vary. Therefore, an offset may be generated from the storage diode SD region of a pixel, on a row basis, due to a difference in output times. Consequently, a shading phenomenon may occur in the final image.

Figure 7:
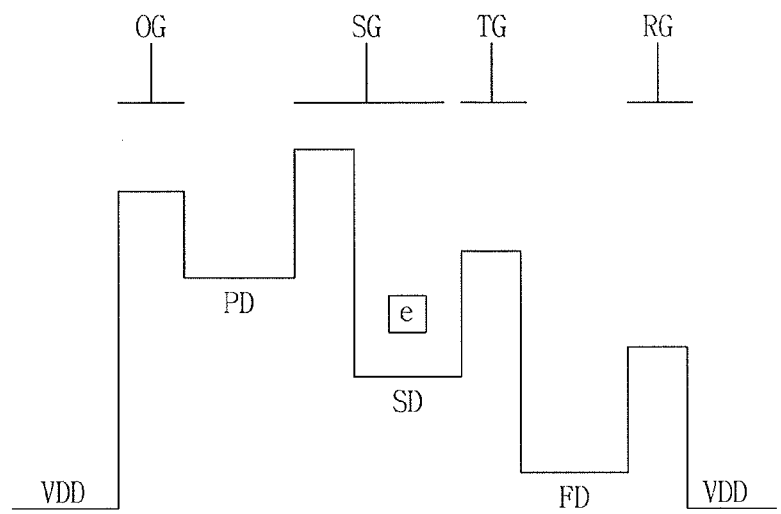
FIG. 7 illustrates an energy band according to one embodiment.

FIG. 7 is an example of an energy band diagram which illustrates energy of the pixel driving circuit based on positions of the pixel driving circuit in FIG. 4. Charge generated from the photodiode PD region is transferred to the storage diode SD region in response to the storage control signal SG. Charge in the storage diode SD region is transferred to the floating diffusion node FD in response to the transfer control signal TG. The charge generated from the photodiode PD region may be transferred by electrons.

Figure 8:
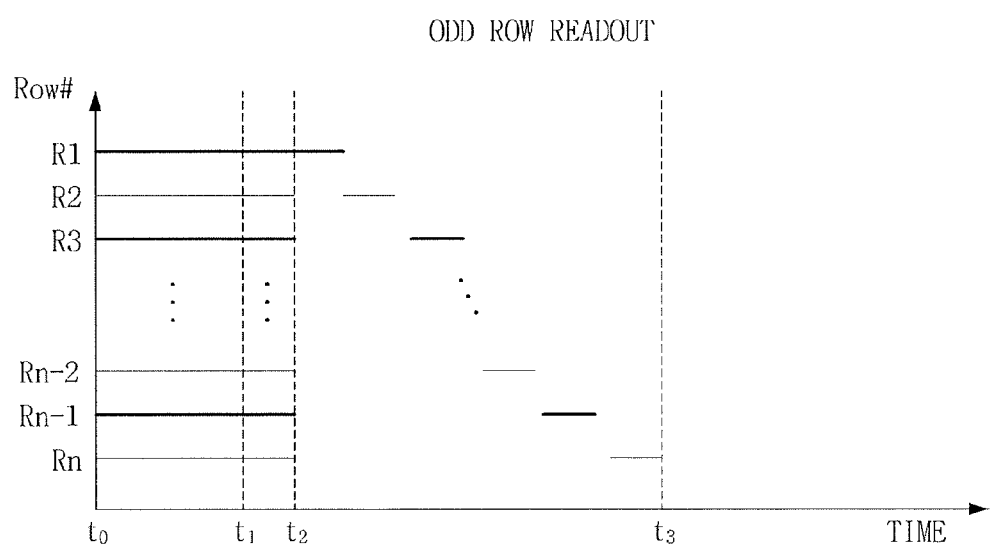
FIG. 8 illustrates an embodiment of a process of outputting data from a pixel array.

FIG. 8 is an embodiment of a timing diagram to be used in a process for outputting data from odd-numbered rows of the pixel array in FIG. 1. The pixel driving circuit 142a or 142b may operate in an even shutter mode, in which odd-numbered rows receive light and even-numbered rows do not receive light. As may be seen in FIG. 8, in odd-numbered rows R1 to Rn-1 of the pixel array, charge is generated from the photodiode PD region of each pixel. This charge is transferred to the storage diode SD region in response to the storage control signal SG. The charge in the storage diode SD region is then transferred to the floating diffusion node FD in response to the transfer control signal TG. Image signals corresponding to an optical signal and leakage current may then be output from the odd-numbered rows R1 to Rn-1 of the pixel array.

Further, charge is not generated from photodiode PD regions in even-numbered rows R2 to Rn of the pixel array. Also, charge is not transferred to the storage diode SD region. In this case, from the even-numbered rows R2 to Rn of the pixel array, image signals corresponding to optical signals are not output and only leakage current may be output. The leakage current may be generated because of the accumulation of leakage charge in the storage diode SD region when the output time is delayed.

In accordance with one embodiment, a method of correcting for an output signal of an image sensor includes transmitting a signal from a photodiode region to a storage diode region in each of the pixels of the odd-numbered rows, reading a signal of a storage diode region in each of the pixels of the odd-numbered rows and the pixels of the even-numbered rows, and subtracting values of signals output from the pixels of the even-numbered rows from corresponding values of signals output from the pixels of the odd-numbered rows, among the readout signals. As a result, image signals output from the image sensor may be corrected and the occurrence of a shading phenomenon in the final image may be reduced or prevented.

Figure 9:
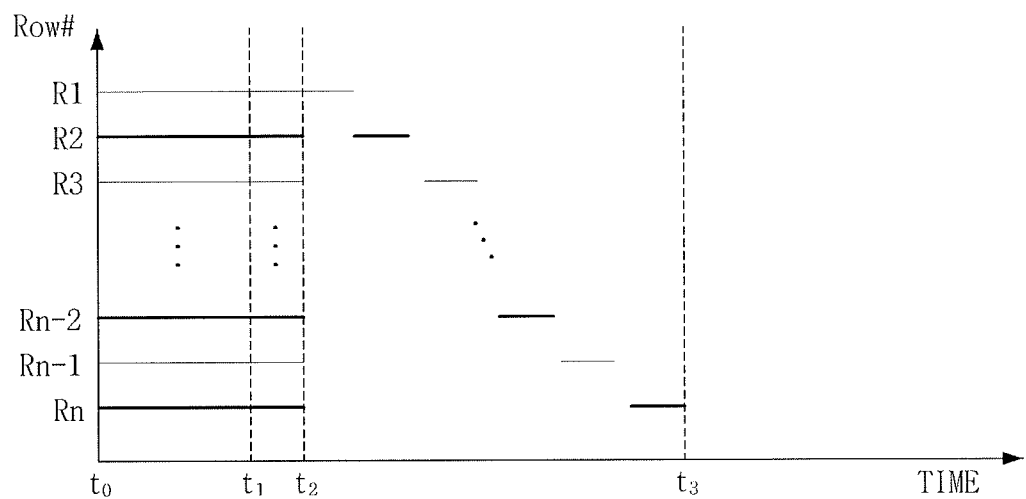
FIG. 9 illustrates another embodiment of a process of outputting data from a pixel array.

FIG. 9 illustrates a timing diagram illustrating a process of outputting data from even-numbered rows of the pixel array of FIG. 1 in accordance with one embodiment. The pixel driving circuit 142a or 142b may operate in an odd shutter mode, in which odd-numbered rows receive light and even-numbered rows do not receive light.

Referring to FIG. 9, in even-numbered rows R2 to Rn of the pixel array, charge is generated from the photodiode PD region and transferred to the storage diode SD region in response to the storage control signal SG. Charge in the storage diode SD region is then transferred to the floating diffusion node FD in response to the transfer control signal TG. Image signals corresponding to optical signals and leakage current may be output from the even-numbered rows R2 to Rn of the pixel array.

Further, charge is not generated from photodiode PD regions in odd-numbered rows R1 to Rn-1 of the pixel array. Also, charge is not transferred to the storage diode SD region. In this case, from the odd-numbered rows R1 to Rn-1 of the pixel array, the image signals corresponding to the optical signals are not output and only leakage current may be output. Leakage current may be generated because of the accumulation of a leakage charge in the storage diode SD region when the output time is delayed.

In accordance with another embodiment, a method of correcting an output signal of an image sensor includes transmitting a signal from a photodiode region to a storage diode region in each of the pixels of the even-numbered rows, reading a signal of a storage diode region in each of the pixels of the even-numbered rows and the pixels of the odd-numbered rows, and subtracting values of signals output from the pixels of the odd-numbered rows from corresponding values of signals output from the pixels of the even-numbered rows, among the readout signals. As a result, image signals output from the image sensor may be corrected and a shading phenomenon in the final image may be reduced or prevented.

As shown in FIGS. 8 and 9, embodiments of the method of correcting the output signal of the image sensor may correct signals corresponding to rows having optical signals using signals corresponding to rows not having optical signals.

Figure 10:
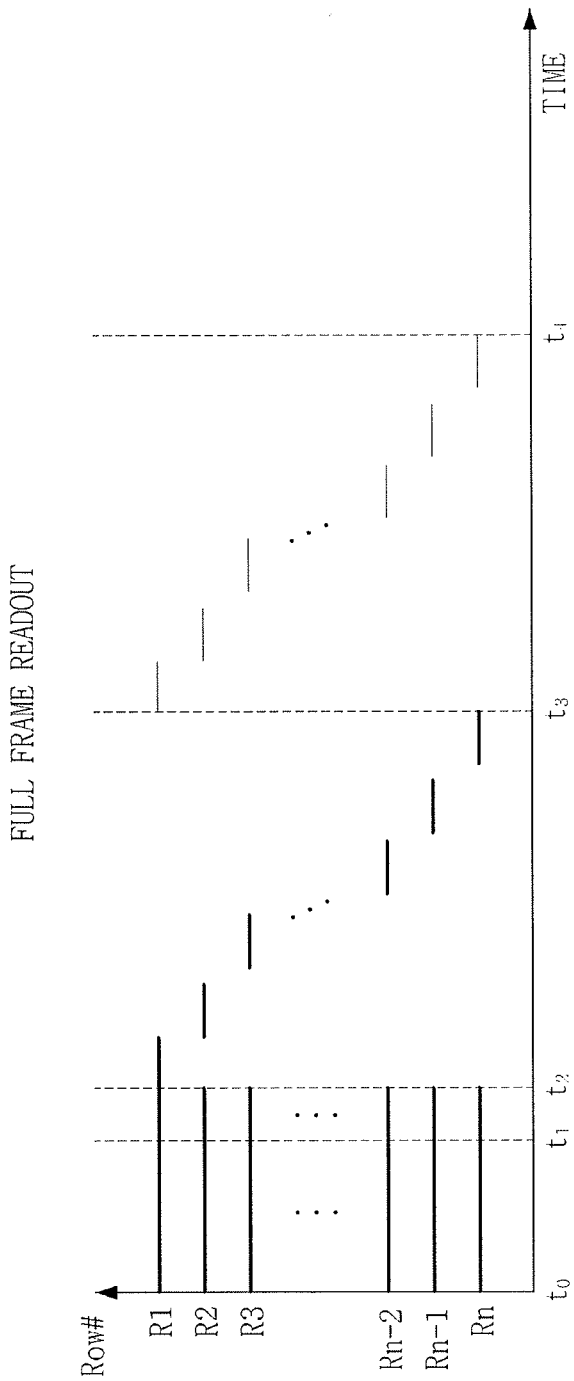
FIG. 10 illustrates an embodiment of a full frame readout method of outputting data from a pixel array.

FIG. 10 is a timing diagram for an embodiment of a process of outputting data in the pixel array of FIG. 1 using a full frame readout method. Referring to FIG. 10, a method of correcting an output signal of an image sensor includes transmitting a signal from a photodiode region to a storage diode region in each of the pixels of the odd-numbered rows R1 to Rn-1 and the pixels of the even-numbered rows R2 to Rn.

The method further includes primarily reading values of signals of a storage diode region in each of the pixels of the odd-numbered rows R1 to Rn-1 and the pixels of the even-numbered rows R2 to and Rn, secondarily reading values of signals of the storage diode region in each of the pixels of the odd-numbered rows R1 to Rn-1 and the pixels of the even-numbered rows R2 to Rn when a storage transistor is turned off, and subtracting values of the secondary readout signals from corresponding values of the primary readout signals. As a result, image signals output from the image sensor may be corrected.

The method corresponding to FIG. 10 primarily outputs image signals for a full frame when charge due to an optical signal is in the storage diode region. This method secondarily outputs image signals for the full frame when charge due to the optical signal is not in the storage diode region. Values of the secondary readout signals are then subtracted from values of the primary readout signals, to thereby correct image signals output from the image sensor.

Figure 11:
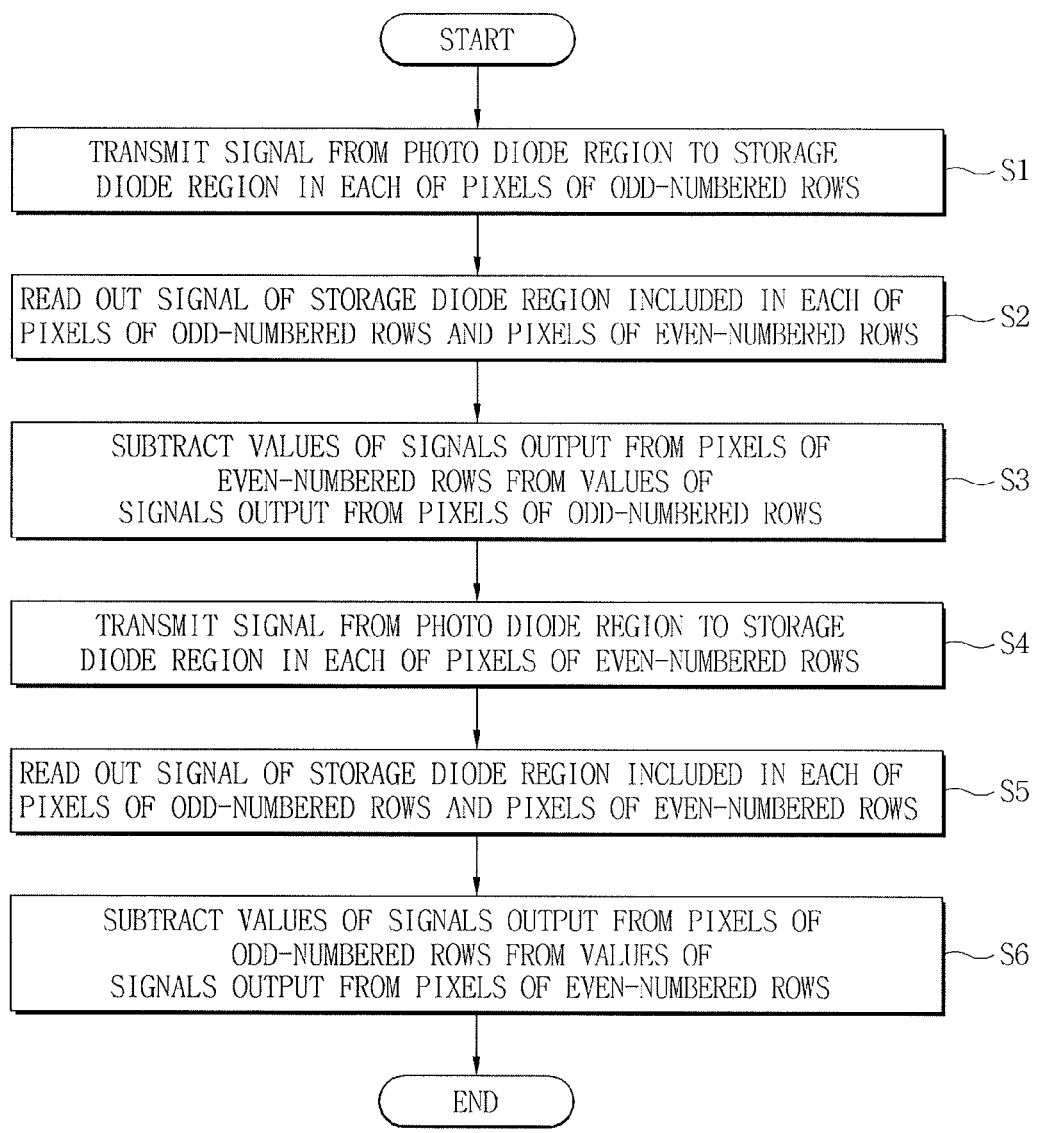
FIG. 11 illustrates an embodiment of a method for correcting an output signal of an image sensor.

FIG. 11 is a flow chart illustrates an embodiment of a method of correcting an output signal of an image sensor. Referring to FIG. 11, the method includes the following operations:

(1) transmitting a signal from a photodiode region to a storage diode region in each of the pixels of the odd-numbered rows (S1);

(2) reading a signal of a storage diode region in each of the pixels of the odd-numbered rows and the pixels of the even-numbered rows (S2);

(3) subtracting values of signals output from the pixels of the even-numbered rows from corresponding values of signals output from the pixels of the odd-numbered rows (S3);

(4) transmitting a signal from a photodiode region to a storage diode region in each of the pixels of the even-numbered rows (S4);

(5) reading a signal of a storage diode region included in each of the pixels of the odd-numbered rows and the pixels of the even-numbered rows (S5); and (6) subtracting values of signals output from the pixels of the odd-numbered rows from corresponding values of signals output from the pixels of the even-numbered rows (S6).

Figure 12:
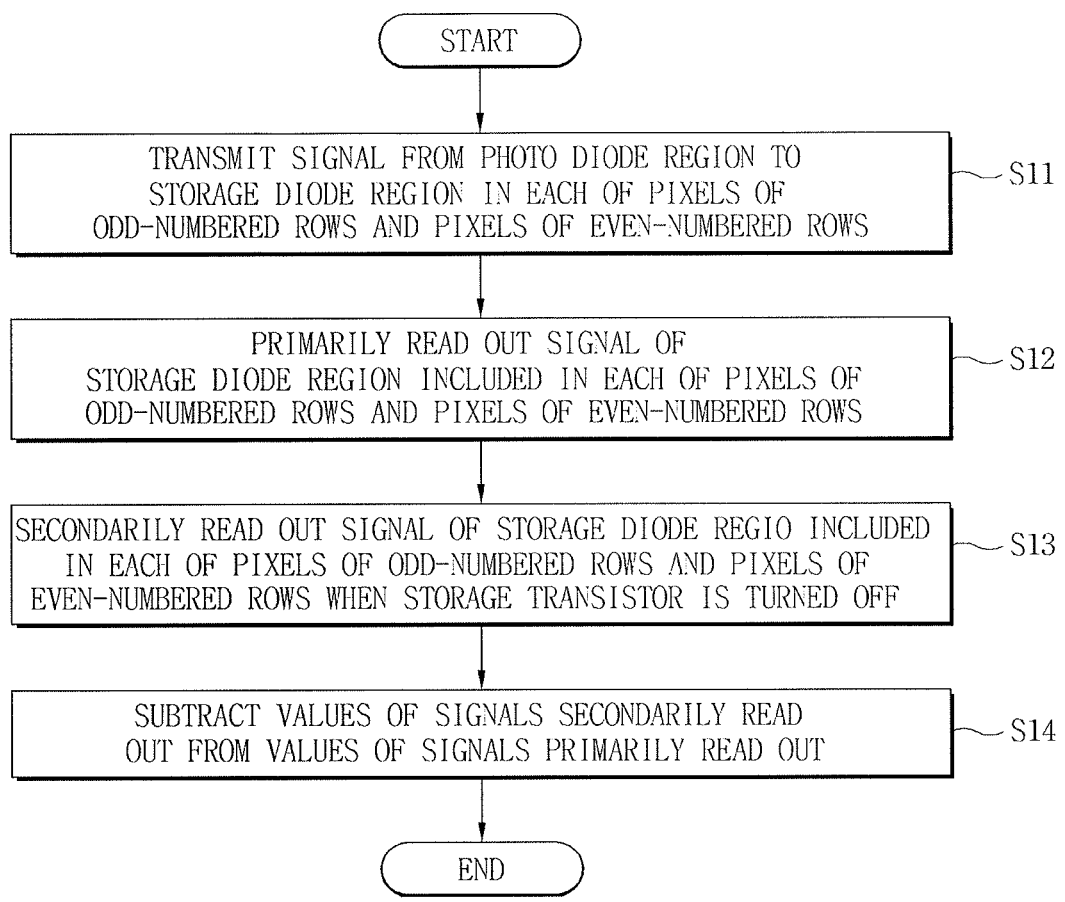
FIG. 12 illustrates another embodiment of a method for correcting an output signal of an image sensor.

FIG. 12 is a flow chart illustrating another embodiment of a method of correcting an output signal of an image sensor. Referring to FIG. 12, the method includes the following operations:

(1) transmitting a signal from a photodiode region to a storage diode region in each of the pixels of the odd-numbered rows and the pixels of the even-numbered rows (S11);

(2) primarily reading a signal of a storage diode region in each of the pixels of the odd-numbered rows and the pixels of the even-numbered rows (S12);

(3) secondarily reading a signal of the storage diode region in each of the pixels of the odd-numbered rows and the pixels of the even-numbered rows when a storage transistor is turned off (S13); and (4) subtracting values of the secondary readout signals from corresponding values of the primary readout signals (S14).

Figure 13:
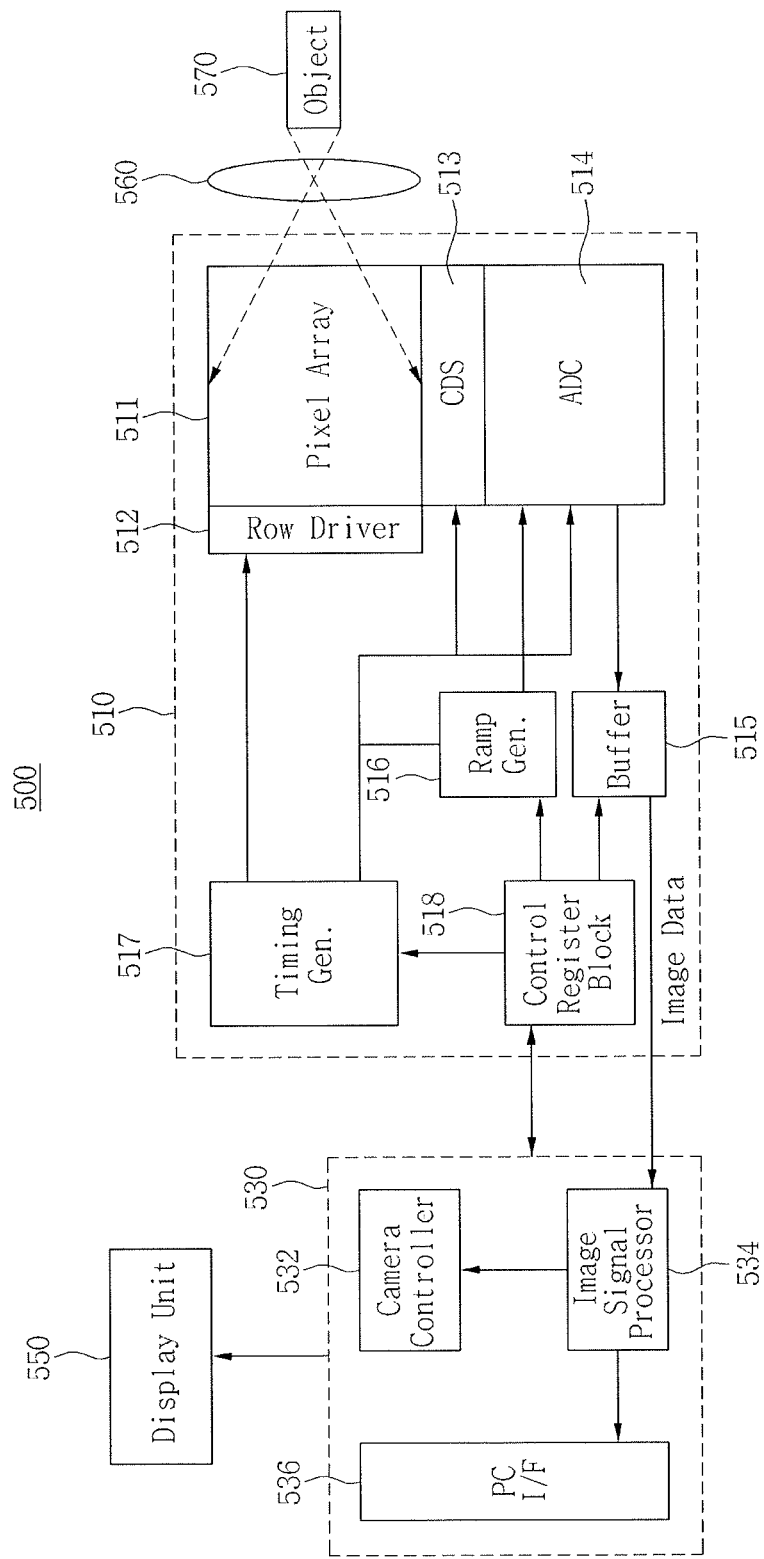
FIG. 13 illustrates an embodiment of an image processing device.

FIG. 13 illustrates an embodiment of an image processing device 500 including the image sensor 100 of FIG. 1. Referring to FIG. 13, the image processing device 500 includes an image sensor 510, an image processor 530, a display unit 550, and an optical lens 560.

The image processing device 500 includes data processing device that includes or is coupled to a digital camera. The image data processing device may be, for example, a personal computer, a mobile phone, a smart phone, a tablet PC, or an information technology device.

The image sensor 510 converts an optical image of an object 570 to an electrical image signal. The optical image may pass through the optical lens 560, and conversion of the optical image to an electrical image signal may be performed under control of the image processor 530.

The image sensor 510 may include a control register block 518 which generates control signals for controlling a ramp generator 516, a timing generator 517, and a buffer 515. The control register block 518 may be controlled by a camera controller 532.

The image processor 530 controls the image sensor 510, processes image data output from the image sensor 510, and transfers the processed data to the display unit 550 to display the processed data. Image data may be generated according to an output signal of the buffer 515. The display unit 550 may include one or more devices for outputting image signals. For example, the display unit 550 may include a computer, a mobile phone, and/or other image output terminals.

The image processor 530 may include the camera controller 532, an image signal processor 534, and a PC interface (I/F) 536. The camera controller 532 controls the control register block 518. The image signal processor 534 processes or manages image data output from the buffer 515, and outputs the processed/managed data to the display unit 550 through the PC I/F 536.

Figure 14:
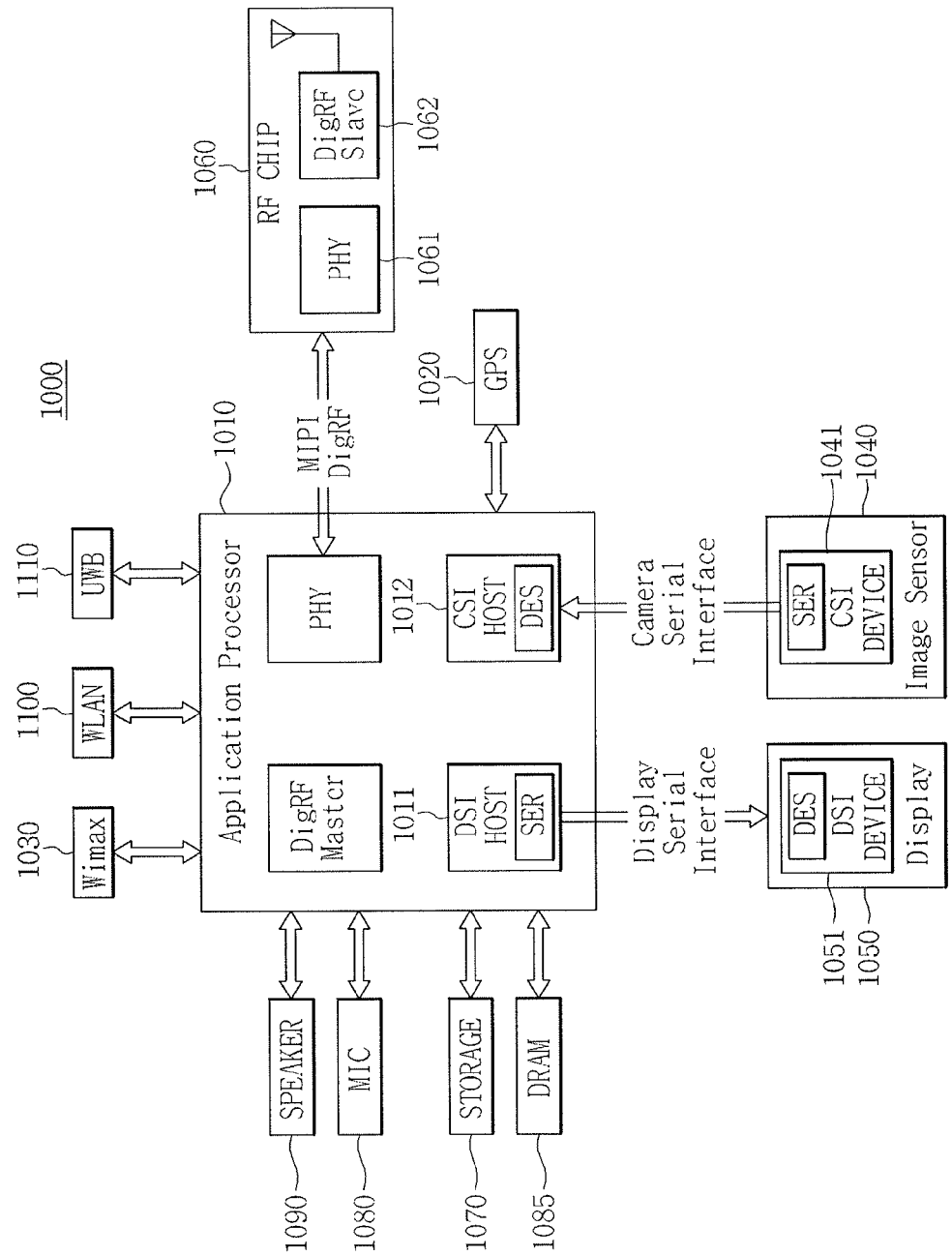
FIG. 14 illustrates an embodiment of an electronic system.

FIG. 14 illustrates an embodiment of an electronic system 1000 which includes the image sensor 100 of FIG. 1. Referring to FIG. 14, the electronic system 1000 may be implemented by a data processing device that may use or support a mobile industry processor interface (MIPI), e.g., a mobile phone, a personal digital assistant (PDA), a portable multimedia player (PMP), or a smart phone.

The electronic system 1000 includes an application processor 1010, an image sensor 1040, and a display 1050. A CSI HOST 1012, in the application processor 1010, may perform serial communications with a CSI device 1041 of the image sensor 1040 through a camera serial interface (CSI). The CSI HOST 1012 may include an optical serializer, and a DSI device 1051 may include an optical deserializer.

The electronic system 1000 may further include an RF chip 1060 that communicates with the application processor 1010. A physical layer PHY 1061 of the electronic system 1000, and a physical layer PHY of the application processor 1010 may receive or transmit data according to MIPIDigRF.

The electronic system 1000 may further include a global positioning system (GPS) 1020, a storage 1070, a microphone (MIC) 1080, a DRAM 1085, and a speaker 1090. The electronic system 1000 may communicate using one or more predetermined communication protocols or standards, e.g., WiMAX (Worldwide Interoperability for Microwave Access) 1030, a WLAN (wireless LAN) 1100, a UWB (ultra wideband) 1110, etc.

In accordance with one or more of the aforementioned embodiments, an image sensor may correct output signals by subtracting values of signals output from pixels of rows not having optical signals from corresponding values of signals output from the pixels of the rows having optical signals, among readout signals. Therefore, the image sensor may correct an offset of the image output signals generated by a light or a dark current.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A method of processing signals from an image sensor, which includes a plurality of pixels in each of a plurality of rows, the method comprising:

outputting signals from pixels in rows having optical signals;

outputting signals from pixels in rows not having optical signals; and correcting the signals from the pixels in rows having optical signals based on the signals corresponding to the pixels in the rows not having optical signals, wherein the pixels in the rows not having optical signals used in correcting the signals from the pixels in rows having optical signals are color pixels for generating an image, wherein correcting the signals corresponding to the pixels in the rows having the optical signals includes correcting signals output from pixels of first rows and correcting signals output from pixels of second rows, and wherein correcting the signals output from the pixels of the first rows includes:

transmitting a signal from a photodiode region to a storage diode region in each of the pixels of the first rows;

reading the signal of the storage diode region included in each of the pixels of the first rows and the pixels of the second rows; and subtracting values of the signals output from the pixels of the second rows from corresponding values of the signals output from the pixels of the first rows.

2. The method as claimed in claim 1, wherein:

the first rows are odd-numbered rows, and the second rows are even-numbered rows.

3. The method as claimed in claim 2, wherein correcting the signals output from the pixels of the second rows includes:

transmitting a signal from a photodiode region to a storage diode region in each of the pixels of the second rows;

reading a signal of a storage diode region included in each of the pixels of the first rows and the pixels of the second rows; and subtracting values of the signals output from the pixels of the first rows, from corresponding values of the signals output from the pixels of the second rows.

4. The method as claimed in claim 1, wherein correcting the signals corresponding to the rows having the optical signals includes:

transmitting a signal from a photodiode region to a storage diode region in each pixel of odd-numbered rows and each pixel of even-numbered rows;

primarily reading a signal of a storage diode region included in each pixel of the odd-numbered rows and each pixel of the even-numbered rows;

secondarily reading a signal of the storage diode region included in each pixel of the odd-numbered rows and each pixel of the even-numbered rows while a storage transistor is turned off; and subtracting values of the secondary readout signals from values of the primary readout signals.

5. An image sensor, comprising:

a row driver to generate a storage control signal, a transfer control signal, a reset control signal, and a row selecting signal;

a pixel array including a plurality of rows of pixels to receive optical signals and to convert the optical signals to electrical signals, and to output the electrical signals as image signals in response to the storage control signal, the transfer control signal, the reset control signal, and the row selecting signal;

an analog-to-digital converter to perform an analog-to-digital conversion on the image signals to generate first signals; and an output correcting circuit to compare sizes of signals corresponding to pixels in rows having optical signals among the first signals with sizes of signals corresponding to pixels in rows not having optical signals, and to correct the signals corresponding to the rows having the optical signals to generate second signals, wherein the pixels in the rows not having optical signals used to correct the signals from pixels in rows having optical signals are color pixels to generate an image, and wherein the image sensor is to transmit signals from photodiode regions to corresponding storage diode regions in the pixels of first rows, read signals of storage diode regions included in the pixels of the first rows and pixels of second rows subtract values of signals output from the pixels of the second rows from corresponding values of signals output from the pixels of the first rows, and correct the signals output from the pixels of the first rows.

6. The image sensor as claimed in claim 5, wherein a time for transferring a charge generated from a photodiode, included in each of the pixels in a row, to a storage diode is different with respect to odd-numbered rows and even-numbered rows of the pixel array.

7. The image sensor as claimed in claim 6, wherein a time for transferring the charge, which is generated from the photodiode included in each of the pixels in a row, to the storage diode is determined by the storage control signal.

8. The image sensor as claimed in claim 6, wherein readout of signals from the storage diodes in the pixels in the plurality of rows is to be performed at substantially a same time.

9. The image sensor as claimed in claim 5, wherein the image sensor is to subtract values of signals output from the pixels of the rows not having optical signals from corresponding values of signals output from the pixels of the rows having optical signals, among the readout signals.

10. The image sensor as claimed in claim 5, wherein the image sensor is to primarily read signals of storage diode regions when corresponding storage transistors are turned on, secondarily read signals of the storage diode regions when the corresponding storage transistors are turned off, subtract values of the secondary readout signals from corresponding values of the primary readout signals, and correct the signals output from the pixels of the odd-numbered rows and the pixels of the even-numbered rows.

11. The image sensor as claimed in claim 5, wherein:
the first rows are odd-numbered rows, and
the second rows are even-numbered rows.

12. The image sensor as claimed in claim 5, wherein the image sensor is to transmit signals from photodiode regions to corresponding storage diode regions in the pixels of even-numbered rows, read signals of storage diode regions included in the pixels of the even-numbered rows and pixels of odd-numbered rows, subtract values of signals output from the pixels of the odd-numbered rows from corresponding values of signals output from the pixels of the even-numbered rows, and correct the signals output from the pixels of the even-numbered rows.

13. The image sensor as claimed in claim 5, wherein the image sensor is to transmit signals from photodiode regions to storage diode regions in the pixels of odd-numbered rows and pixels of even-numbered rows, primarily read signals of storage diode regions included in the pixels of the odd-numbered rows and the pixels of the even-numbered rows when a storage transistor is turned on, secondarily read signals of storage diode regions included in the pixels of the odd-numbered rows and the pixels of the even-numbered rows when a storage transistor is turned off, subtract values of the secondary readout signals from values of the primary readout signals, and correct the signals output from the pixels of the odd-numbered rows and the pixels of the even-numbered rows.

14. The image sensor as claimed in claim 5, further comprising: a buffer circuit to latch and amplify the second signals to generate output signals.

15. A method for correcting signals from an image sensor, the method comprising:

transmitting a signal from a photodiode region to a storage diode region in each of a plurality of pixels in first rows of the image sensor;

reading a signal of a storage diode region in each of the pixels of the first rows and each of a plurality of pixels in second rows of the image sensor; and subtracting values of signals from the pixels of the second rows from corresponding values of signals output from the pixels of the first rows among the readout signals, wherein:

the pixels in the first and second rows are color pixels for generating an image, the signal readout from the storage diode region in each of the pixels of the first rows is based on charge generated from a corresponding photodiode, and the signal read out from the storage diode region in each of the pixels in the second rows is based on leakage current and is independent from charge generated from a corresponding photodiode.

16. The method as claimed in claim 15, wherein:
the first rows are odd-numbered rows, and
the second rows are even-numbered rows.

17. The method as claimed in claim 15, wherein:
the pixels in the first row have optical signals, and
the pixels in the second row do not have optical signals.

18. The method as claimed in claim 15, wherein the signals are read out from the storage diode regions in the pixels of the first and second rows at substantially a same time.

\* \* \* \* \*